US007412087B2

(12) United States Patent
Buntscheck

(10) Patent No.: US 7,412,087 B2
(45) Date of Patent: Aug. 12, 2008

(54) SYSTEM AND METHOD FOR MONITORING BANK NOTES FOR THE PRESENCE OF COUNTERFEIT BANK NOTES

(75) Inventor: Wilhelm Buntscheck, Wolfratshausen (DE)

(73) Assignee: Giesecke & Devrient GmbH, Munich (DE)

( * ) Notice: Subject to any disclaimer, the term of this patent is extended or adjusted under 35 U.S.C. 154(b) by 840 days.

(21) Appl. No.: 10/653,449

(22) Filed: Sep. 3, 2003

(65) Prior Publication Data

US 2004/0062430 A1 Apr. 1, 2004

(30) Foreign Application Priority Data

Sep. 5, 2002 (DE) ................................ 102 41 149

(51) Int. Cl.
*G06K 9/00* (2006.01)

(52) U.S. Cl. ....................... 382/137; 382/135; 404/110; 902/7; 902/28

(58) Field of Classification Search ................. 382/135, 382/136, 137, 138, 139, 140; 194/206; 235/375, 235/379, 380; 434/110; 902/7, 15, 17, 28
See application file for complete search history.

(56) References Cited

U.S. PATENT DOCUMENTS 4,556,140 A * 12/1985 Okada ........................ 194/206
5,256,862 A * 10/1993 Watanabe et al. ........... 235/379
5,777,304 A * 7/1998 Awatsu et al. ............... 235/379
6,026,175 A * 2/2000 Munro et al. ............... 382/135
6,065,672 A * 5/2000 Haycock ...................... 235/379
6,363,164 B1 * 3/2002 Jones et al. ................. 382/135
6,371,303 B1 * 4/2002 Klein et al. ................. 209/534
6,398,107 B1 * 6/2002 Neri ........................... 235/379

FOREIGN PATENT DOCUMENTS

| | | | |
|---|---|---|---|
| DE | 19824435 | A1 | 12/1999 |
| DE | 200 03 253 | U1 | 9/2000 |
| DE | 101 07 344 | A1 | 10/2001 |
| GB | 2 268 294 | A | 1/1994 |
| WO | WO 01/18754 | A1 | 3/2001 |

* cited by examiner

*Primary Examiner*—Abolfazl Tabatabai
(74) *Attorney, Agent, or Firm*—Rothwell, Figg, Ernst & Manbeck P.C.

(57) ABSTRACT

A system and method for monitoring bank notes for the presence of counterfeit bank notes provides for the detection of such data of each bank note to be monitored that permit a judgement to be made on the authenticity of the bank note. By way of the data detected, the authenticity of each bank note is judged, and in the event that the judgement of the authenticity of the respective bank note leads to the conclusion that a counterfeit and/or counterfeit suspect bank note is present, the data of the respective bank note are transferred to a data bank.

18 Claims, 2 Drawing Sheets

SYSTEM AND METHOD FOR MONITORING BANK NOTES FOR THE PRESENCE OF COUNTERFEIT BANK NOTES

BACKGROUND OF THE INVENTION

1. Field of the Invention

The present invention relates to a system and a method for monitoring bank notes for the presence of counterfeit bank notes.

2. Description of the Background Art

It happens again and again that counterfeit bank notes are infiltrated in the circulation of bank notes. These counterfeit bank notes so far are recognized, for example, upon receipt of the bank notes by a cashier or by bank note processing machines detecting by means of authenticity verifying sensors whether these are counterfeit bank notes. As a rule, bank notes recognized as forgery or as being suspect of forgery, are separated from the remaining bank notes and are re-examined by a central authority, for example a national or supranational issuing bank or by police authorities. Bank notes confirmed as counterfeit bank notes in such re-examination are then evaluated in order to reveal specific, conspicuous features distinguishing the counterfeit bank note from genuine bank notes. These features will be used later on for being able to recognize forgeries of the same type more easily.

However, in the current monitoring of bank notes for the presence of counterfeit bank notes it has turned out to be especially disadvantageous that the counterfeit bank notes or counterfeit suspect bank notes have to be transported to a central location where they are checked again. This entails a loss of time on the one hand, since features particularly characteristic of the counterfeit bank notes are available for examining additional bank notes only after these features have been obtained at the central location. In addition thereto, this procedure involves high expenditure and costs as comprehensive logistics have to be kept ready in order to ensure rapid and smooth transport of counterfeit bank notes to this central location.

SUMMARY OF THE INVENTION

It is therefore an object of the present invention to indicate a system and a method for monitoring bank notes for the presence of counterfeit bank notes which, with reduced expenditure, ensure faster availability of forgery-relevant features of counterfeit bank notes.

The invention is based on the deliberation that the monitoring of bank notes for the presence of counterfeit bank notes includes the detection of such data of each bank note to be monitored that permit a judgement of the authenticity of the bank note, that the authenticity of the respective bank note is judged on the basis of the data detected, and in the event that the judgement of the authenticity of the respective bank note leads to the conclusion that a counterfeit bank note and/or a counterfeit suspect bank note is present, the data of the respective bank note are transferred to a data bank.

The invention thus comprises in particular the advantage that data of counterfeit bank notes and/or counterfeit suspect bank notes, which are related to the judgement of the authenticity of the bank note, are immediately available at a central location as soon as a counterfeit bank note and/or counterfeit suspect bank note is detected at any place. It is thus possible at any time to react rapidly and without delay in time on the appearance of specific counterfeit bank notes as the corresponding data from various places meet in one central location.

An advantageous development of the invention provides for linking the data of the respective counterfeit bank note with an indication of place so that conclusions as to the place of appearance of the respective counterfeit bank note are possible at any time.

An additional advantageous development of the invention provides for linking the data of the respective counterfeit bank note with an indication of time, thus permitting conclusions to be drawn as to the time of appearance of the respective counterfeit bank note.

BRIEF DESCRIPTION OF THE DRAWINGS

According to another advantageous development of the invention it is provided that the data of counterfeit bank notes stored in the data bank are made available for monitoring bank notes for the presence of counterfeit bank notes. In monitoring bank notes, this renders possible in particular to make use in each case of current data of counterfeit bank notes in any place in order to detect also forgery series that have been infiltrated in the bank note circulation for a short time only.

DETAILED DESCRIPTION OF THE INVENTION

Figure 1:
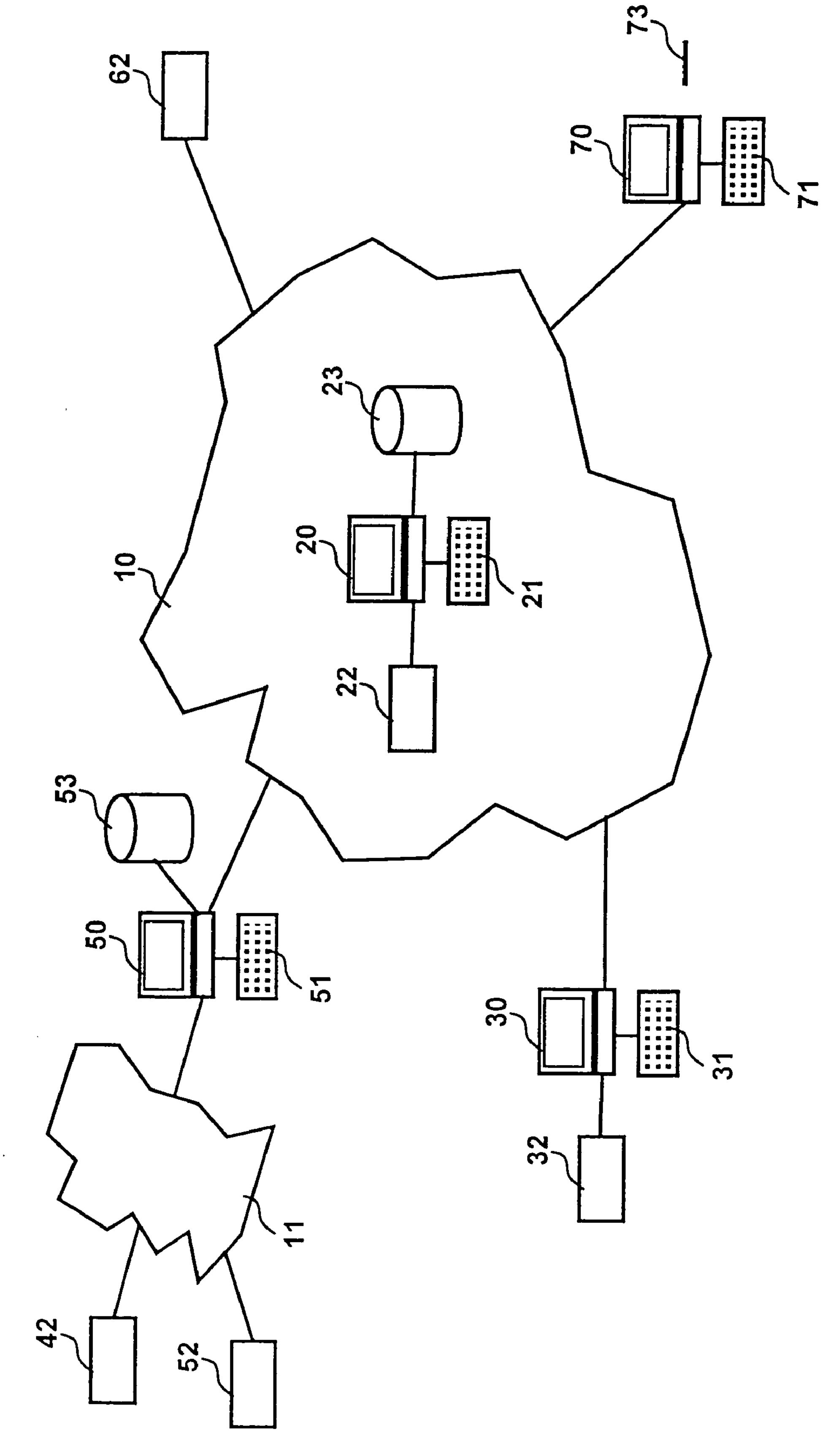
Figure 2:
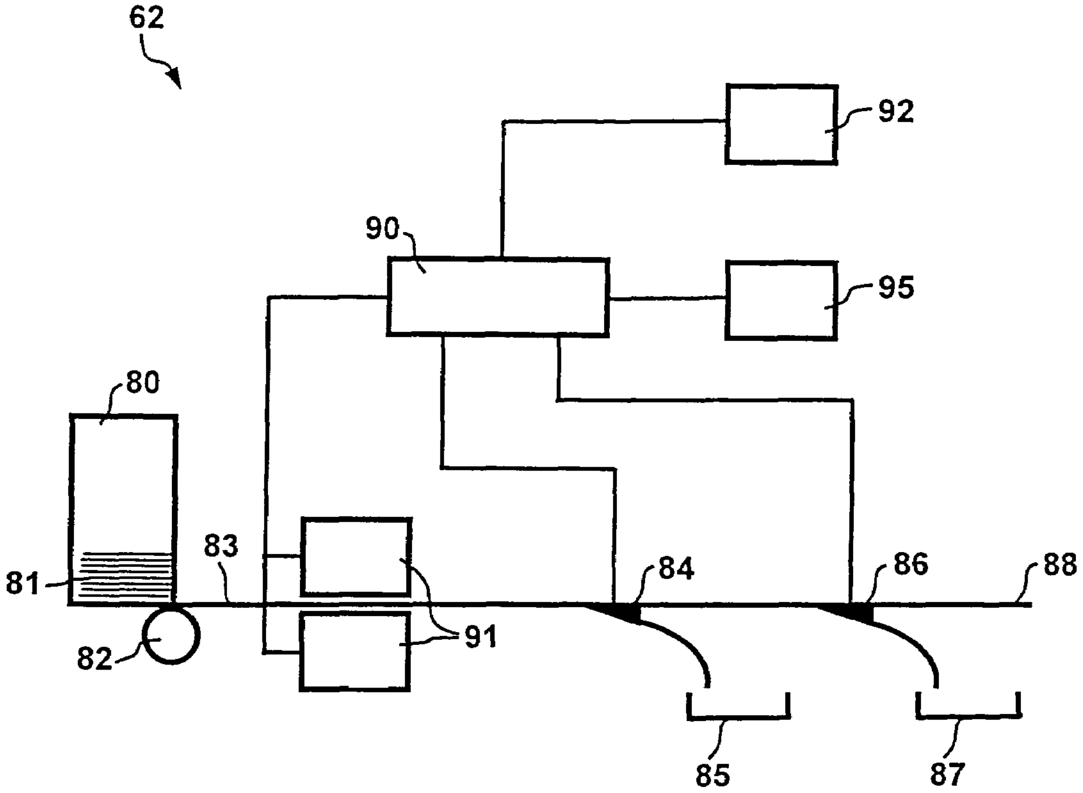

Additional advantages of the present invention present themselves from the following description of embodiments with reference to the figures, in which:

FIG. 1 shows an overall view of a fundamental structure of a system for monitoring bank notes for the presence of counterfeit bank notes, and FIG. 2 shows part of the system according to FIG. 1, for detecting data of bank notes.

The figures illustrate only those components of a system for monitoring bank notes for the presence of counterfeit bank notes that are of relevance in connection with the present invention.

FIG. 1 shows an overall view of a fundamental structure of a system for monitoring bank notes for the presence of counterfeit bank notes.

The system comprises a data bank 23 arranged at a central location and connected to a communications network 10 via a control unit 20, 21. The communications network 10 may be constituted e.g. by a public telephone network, the Internet or the like. The data bank 23 and the control unit 20, 21 may be constituted e.g. by a computer, in particular a personal computer, with the computer being connected to the telephone network via a suitable interface, e.g. a modem.

The communications network 10 provides for communication of a multiplicity of external locations 30 to 73 for monitoring bank notes with the data bank 23. At the location 30 to 32, a control means 30, 31, e.g. a computer, communicates via a suitable interface, e.g. a modem, with the communications network 10 and thus with the data bank 23. Connected to the control means 30, 31 is a means 32 for detecting data of each bank note to be monitored and for judging the authenticity of the respective data on the basis of the data detected. If a bank note is rated as counterfeit and/or counterfeit suspect by said means 32, the data of this bank note are transferred to the control means 30, 31. The control means 30, 31 or the interface thereof, respectively, establishes a connection to the data bank 23 via the communications network 10 and transmits the data of the counterfeit and/or counterfeit suspect bank note detected by the means 32 to the data bank 23 where the data of the counterfeit and/or counterfeit suspect bank note are stored. It is also possible to provide the means 32 for detection of each bank note to be monitored only, whereas the judgement of the authenticity is carried out by the control means 30, 31 on the basis of the detected data of each bank note.

A further location 42 to 53 is provided with a plurality of means 42, 52 for detecting data of each bank note to be monitored and for judging the data detected, with two such means being illustrated in exemplary manner. The means 42, 52 are connected to a control means 50, 51 via a second communications network 11, e.g. a LAN (Local Area Network), a WAN (Wide Area Network) or the like. In the manner described hereinbefore, data of counterfeit and/or counterfeit suspect bank notes of said means 42, 52 are transferred via the second communications network 11, a control means 50, 51 and an interface optionally provided in the control means 50, 51 to the data bank 23 via the communications network 10 and are stored in the data bank 23. For backing-up or temporarily storing the data of counterfeit and/or counterfeit suspect bank notes, there may be connected a second data bank 53 to the control means 50, 51 for storing the data of counterfeit and/or counterfeit suspect bank notes originating from said means 42, 52. It may be provided in this regard that the data stored in the second data bank 53 are transferred via the communications network 10 to the central data bank 23 in certain intervals of time only. It is possible in this case that the transfer of data of a counterfeit and/or counterfeit suspect bank note to the data bank 23 in the central location is effected upon expiration of the period provided for only, i.e. the data are stored temporarily in the second data bank 53.

A third location is provided with an additional means 62 for detecting data of each bank note to be monitored and for judging the authenticity of the bank note to the judged on the basis of the data detected. The means 62 is connected to the communications network 10 directly, for example via a suitable interface, e.g. a modem. If the means 62 judges a bank note to be counterfeit and/or counterfeit suspect, the data of the counterfeit and/or counterfeit suspect bank note detected by means 52 are transferred to the data bank 23 via the communications network. In this respect, the modem of means 32 may maintain a permanent connection to the data bank 23 via the communications network 10, but it is also possible for the modem of means 62 to establish a connection to the data bank 23 via the communications network 10 only when there are corresponding data present for transmission.

At an additional non-central location, there is provided a control means 70, 71 that may be constituted e.g. by a computer, in particular a personal computer. The control means 70, 71 communicates with data bank 23 via the communications network 10 e.g. by means of a modem. The control means 70, 71 has a read/write means for a data carrier 73, e.g. a magnetic or optic data carrier. The data carrier 73 has stored thereon data of counterfeit and/or counterfeit suspect bank notes that are read by the write/read means of the control means 70, 71 for transferring the same to the data bank 23 via the communications network 10.

FIG. 2 illustrates part of the system according to FIG. 1, for detecting data of bank notes and judging the authenticity of the bank notes on the basis of the data detected.

FIG. 2 shows in exemplary manner a means 62, however, the means 32, 42 and 52 may be of similar structure.

Means 62 comprises an input tray 80 for introducing bank notes 81 to be monitored, which is engaged by a singling means 82. Singling means 82 takes each time one of the bank notes 81 to be monitored and transfers the single bank note to a transport system 83 transporting the single bank note through a sensor means 91. The sensor means 91 detects data of the single bank note that are of relevance for judging the authenticity thereof. Such features can be detected e.g. optically, electrically and/or magnetically. Known authenticity features comprise, for example, printing inks with specific optical and/or magnetic properties, metallic or magnetic security threads, the use of brightener-free bank note paper, information contained in an electric circuit, etc. The data of the corresponding authenticity features are detected by said sensor means 91 and transferred to a control means 90. In the control means 90, the data detected are compared with data stored in control means 90 that permit the recognition of genuine and counterfeit and/or counterfeit suspect bank notes, respectively. Due to the monitoring or examination of the respective bank note carried out by control means 90, switch means 84, 86 arranged in transport system 83 are driven such that e.g. counterfeit or counterfeit suspect bank notes are deposited in an output tray 85, whereas bank notes rated as genuine may be deposited in an output tray 87 or fed to further processing 88 via the transport system 88. For controlling said means 62, an input/output means 95 is connected to control means 90, e.g. for being able to select specific operating modes or for informing an operator on the processing of the bank notes 81 to be monitored, respectively. In addition thereto, the control means 90 has an interface 92 connected thereto that may be constituted e.g. by a modem communicating with the communications network 10. If the monitoring of bank notes leads to the detection of counterfeit and/or counterfeit suspect bank notes by the control means 90, the data of these bank notes detected by sensor means 91 are transferred via interface 92 and communications network 10 to the data bank 23 at the central location.

The structure described in exemplary manner for means 62 may constitute, for example, a bank note processing machine used for bank note counting, checking, sorting etc. It is also conceivable that the means 62 constitutes an automatic teller machine that can be utilized e.g. for depositing bank notes. However, means 62 may also be part of an automatic vending machine.

The data of counterfeit and/or counterfeit suspect bank notes of the external locations 30 to 73 are stored in data bank 23 of the central location. The data may be stored in the manner as generated by the external locations 30 to 73. In addition thereto or differently therefrom, it is also possible that the data are normalized, i.e. the data of the external locations 30 to 73, which may have different data formats, are converted to a common data format for facilitating subsequent or further processing and evaluation of the data.

Furthermore, it is possible to provide for classification of the data, deciding e.g. whether a bank note really is counterfeit or whether it is a bank note that is suspected to be counterfeit, but turns out to be genuine. The classification may be carried out by an operator by means of the control unit 20, 21 of the central location. However, classification may also be carried out automatically by the control unit 20, 21 by means of suitable software.

Furthermore, provisions may be made for performing in the control unit 20, 21 an evaluation of the data stored in data bank 23 or of the data transmitted from the external locations 30 to 73 via the communications network 10. For example, a data-related local indication as to the external location from which the data originated may be used for determining the place of appearance of the counterfeit bank note.

By comparison of the local indications of other counterfeit bank notes stored in data bank 23, it is possible to determine whether forgeries are present in increased numbers in a certain local area and whether these forgeries are related to each other, e.g. a series of counterfeit bank notes in which the counterfeit bank notes have like or similar data.

By evaluation of an indication of time related to the data of the respective counterfeit bank note, it is possible furthermore to determine whether certain forgeries are present in increased numbers within a period of time.

The items of information obtained in evaluating the indications of place and the indications of time, of course, can be linked in order to find out whether there is a specific area in which counterfeit bank notes are present in increased numbers within a period of time.

The relationships revealed in such evaluations, for example, may be compiled in tables or reproduced in the form of geographic information, e.g. by entry of the frequency of occurrence thereof in a map.

The described evaluation of the data of counterfeit and/or counterfeit suspect bank notes takes account of the type of the bank note, i.e. it is determined to which currency and which denomination the bank note belongs. The information on the bank note belonging to a specific currency and/or denomination may already be determined at the external locations 30 to 73, but optionally may be determined also—or in addition for examination thereof—by the control unit 20 at the central location.

The central location furthermore may comprise a means 22 connected to the control unit 20 for detecting data of bank notes that are present at the central location and are to be checked. The detection of data takes place in the manner described hereinbefore for the external locations 30 to 73, with the transfer of the data obtained via the communications network 10 being not necessary. The control unit 20 at the central location may also have a write/read means as described before in connection with the control means 70, 71 at the non-central location, permitting data stored on a data carier to be read for storing the same in the data bank 23.

The data of counterfeit and/or counterfeit suspect bank notes stored in data bank 23 may be utilized for further improving the recognition of counterfeit bank notes. To this end, measures can be taken to transmit the data of counterfeit and/or counterfeit suspect bank notes, that are stored in the data bank 23, to the external locations 30 to 73 via the communications network 10. At the non-central locations 30 to 73, the data of data bank 23 are utilized in said means 32, 42, 52, 62 and the control means 30, 50, 90, respectively, to perform the monitoring of bank notes for the presence of counterfeit and/or counterfeit suspect bank notes. The recognition of counterfeit bank notes is thus improved since the data used as basis for monitoring can always be currently matched to counterfeit bank notes in circulation.

The data from data bank 23 may be used in addition to the data already present, however, it is also possible that they replace the data used before at the external locations 30 to 73.

It is just as well possible to summarize the data stored in data bank 23 for specific types of bank notes, i.e. for a specific currency and a specific denomination. To this end, the data are processed by the control unit 20, 21 and summarized in the form of one single data record for a bank note of the particular currency and denomination.

The data of the central location or data bank 23 may also be transferred to the external location 70, 71 and may there be written onto the data carrier 73 by means of the write/read means. The data carrier 73 may then be used for transferring the data to a means corresponding to means 32, 42, 52, 62. Such a data carrier may also be generated at the central location.

The structure described and illustrated in FIG. 1 may be employed, for example, in the area of distribution of a currency. The central location 20 to 23 then is located e.g. at the central bank in charge, whereas the external locations 30 to 73 are constituted by regional branches of the central bank, bank institutes, automatic cash depositing machines, police authorities etc. It is possible in this case that information obtained in evaluating the data stored in the data bank are transferred to specific ones of the external locations 30 to 73 in visual form in order to evoke corresponding attention or produce alarm messages. Corresponding messages to banks or police authorities, for example, may provide indications to the effect that there are currently bank notes of a currency and denomination in circulation in a specific area that are often counterfeit and display specific forgery features. When these forgery features are known, such counterfeit bank notes can also be recognized easily by persons with corresponding information.

In addition to the embodiment depicted in FIG. 1, it is also possible that several central locations are provided that are interconnected. These central locations may be, for example, various central banks in charge of issuing different currencies. If, in the territory of one of the central banks, counterfeit bank notes appear in a currency of another one of the central banks, corresponding information may be transmitted to the central location of the central bank in charge of issuing the currency concerned.

In addition thereto, it is of course also possible to transfer all other forgery-relevant data of each currency to any one of the central locations of the other central banks. In this regard, it is also possible that the afore-described normalization and/or classification of the data is carried out in different manner in the various central banks. Each of the various central banks may then process the data originating from a different central bank in such a manner that these are in conformity with the normalization and/or classification used by the particular central bank. The central banks may just as well mutually exchange the data detected of the counterfeit and/or counterfeit suspect bank notes, i.e. data are not normalized or standardized and/or classified.

The invention claimed is:

1. A method for monitoring bank notes for the presence of counterfeit bank notes, comprising the steps of:

detecting, by means of a sensor device at each of a plurality of external locations, data of each bank note to be monitored that permit judgement of authenticity of the bank note, and judging the authenticity of the respective bank note at the external locations on the basis of the data detected, characterized in that, in the event that a judgement of the authenticity of the respective bank note leads to a conclusion that at least one of a counterfeit and suspect bank note is present, the data of the respective bank note are transferred from the respective external location to a database disposed at a central location.

2. A method according to claim 1, characterized in that data of the respective counterfeit bank note are stored in the database.

3. A method according to claim 2, characterized in that the data of the respective counterfeit bank notes are compared to data that are already stored in the database.

4. A method according to claim 2, characterized in that data of counterfeit bank notes stored in the database are made available for monitoring bank notes for the presence of counterfeit bank notes.

5. A method according to claim 1, characterized in that the data of the respective counterfeit bank notes are normalized.

6. A method according to claim 1, characterized in that the data of the respective counterfeit bank notes are classified.

7. A method according to claim 1,
characterized in that the data of the respective counterfeit bank note are linked with an indication of place permitting conclusions as to the place of appearance of the respective counterfeit bank note.

8. A method according to claim 7,
characterized by establishing conformities or similarities of the indication of place and/or the indication of time of the respective bank note with respect to the indications of place and/or time that are already stored in the database.

9. A method according to claim 1,
characterized in that the data of the respective counterfeit bank note are linked with an indication of time permitting conclusions as to the time of appearance of the respective counterfeit bank note.

10. A method according to claim 1,
characterized in that the processing of the data of counterfeit bank notes is carried out in accordance with a bank note type selected from a group consisting of currency of the bank notes, denomination of the bank notes, and a combination thereof.

11. A system for monitoring bank notes for the presence of counterfeit bank notes, comprising:
a plurality of external locations each having sensor means for detecting data of each bank note to be monitored that permit judgement of authenticity of the bank note, and
a control means for judging the authenticity of the respective bank note on a basis of the data detected,
characterized by an interface at each of the plurality of external locations which, under control of said control means, establishes a connection to from the respective external location to a database at a central location, via a communications network in an event that the judgement of the authenticity of the respective bank note by said control means has led to a conclusion that at least one of a counterfeit and suspect bank note is present, and data of the respective bank note are transferred to said database.

12. A system according to claim 11,
characterized in that the database stores the data of the respective counterfeit bank note.

13. A system according to claim 12,
characterized in that the database is connected to a control unit comparing the data of each counterfeit bank note to data already stored in said database.

14. A system according to claim 12,
characterized in that said control unit transfers the data of counterfeit bank notes stored in the database to the control means via the communications network, and in that the control means utilizes the data transferred for monitoring bank notes for presence of counterfeit bank notes.

15. A system according to claim 14,
characterized in that the data of said database are stored in said control means.

16. A system according to claim 11,
characterized in that said control means links the data of the respective counterfeit bank note with an indication of place.

17. A system according to claim 16,
characterized in that said control unit compares indications of at least one of place or time of the respective counterfeit bank note to indications of at least one of place or time stored in said database.

18. A system according to claim 11,
characterized in that said control means links the data of the respective counterfeit bank note with an indication of time.

* * * * *